(12) United States Patent
Yoshimura et al.

(10) Patent No.: US 6,204,886 B1
(45) Date of Patent: Mar. 20, 2001

(54) TV RECEIVER HAVING RECORDING/ REPRODUCING FUNCTIONS AND METHOD OF RECORDING/REPRODUCING TV SIGNALS

(75) Inventors: Kosuke Yoshimura, Kanagawa; Ryo Ito, Tokyo; Shinichi Suenaga, Kanagawa; Hitoshi Nakamura; Naoki Okamoto, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/202,911
(22) PCT Filed: Apr. 24, 1998
(86) PCT No.: PCT/JP98/01911
§ 371 Date: Dec. 23, 1998
§ 102(e) Date: Dec. 23, 1998
(87) PCT Pub. No.: WO98/49833
PCT Pub. Date: May 11, 1998

(30) Foreign Application Priority Data

Apr. 25, 1997 (JP) .................................................. 9-109254
Apr. 24, 1998 (US) ...................................... PCT/JP98/01911

(51) Int. Cl.⁷ .................................................. H04N 5/445
(52) U.S. Cl. .......................................... 348/564; 348/569
(58) Field of Search ................................... 348/564, 563, 348/565, 567, 568, 569; 386/46, 52, 66, 83; H04N 5/445

(56) References Cited

U.S. PATENT DOCUMENTS 5,852,474 * 12/1998 Nakagaki et al. ................... 348/564

FOREIGN PATENT DOCUMENTS 8-138318 * 5/1996 (JP) ............................. H04N/5/765

OTHER PUBLICATIONS

JP, 8–138318, A (Matsushita Electric Industrial Co., Ltd.), May 31, 1996 & EP, 762756, A2.

JP, 6–245157, A (Mitsubishi Electric Corp.), Sep. 2, 1994.

JP, 8–256304, A (Oki Electric Industry Co., Ltd.), Oct. 1, 1996.

JP, 7–030851, A (Fujitsu General Ltd.), Jan. 31, 1995.

* cited by examiner

Primary Examiner—Victor R. Kostak
(74) Attorney, Agent, or Firm—Frommer Lawrence & Haug, LLP.; William S. Frommer; Gordon Kessler

(57) ABSTRACT

A received television broadcasting signal is always recorded to a hard disk. In the hard disk, by time-divisionally processing the recording and reproduction, they are executed in parallel. In the television broadcasting, when the user wants to see a video image which has already become a past image, a high speed reverse rotation reproduction is instructed by the user. The video image is switched from the video image by the television broadcasting to the reproduction video image reproduced from the hard disk. The user designates the reproducing position while seeing the video image reproduced by the reverse rotation. The forward rotation reproduction is started from the designated position. When a scene which the user wants to see is finished and the forward rotation reproduction is cancelled by the user, the video image is switched from the reproduction video image to the video image of the television broadcasting.

18 Claims, 12 Drawing Sheets

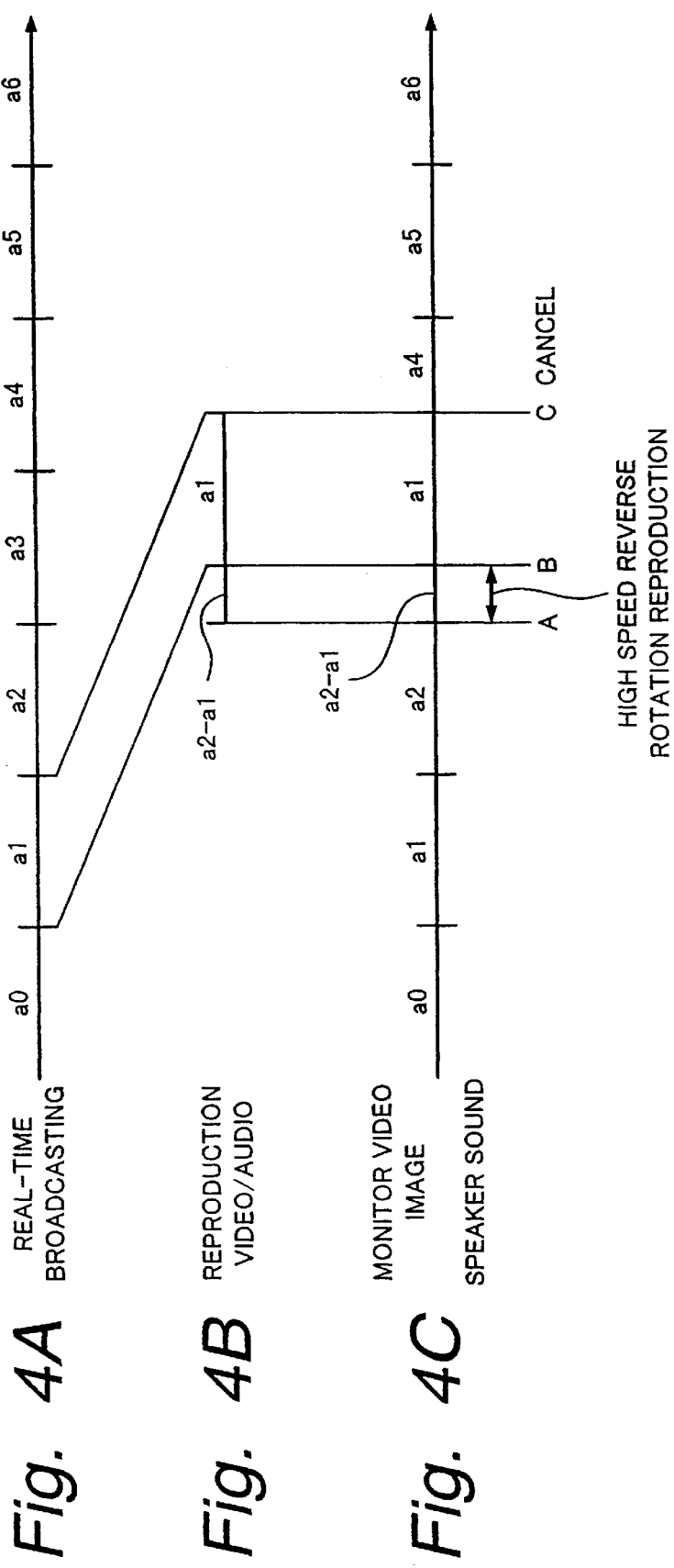

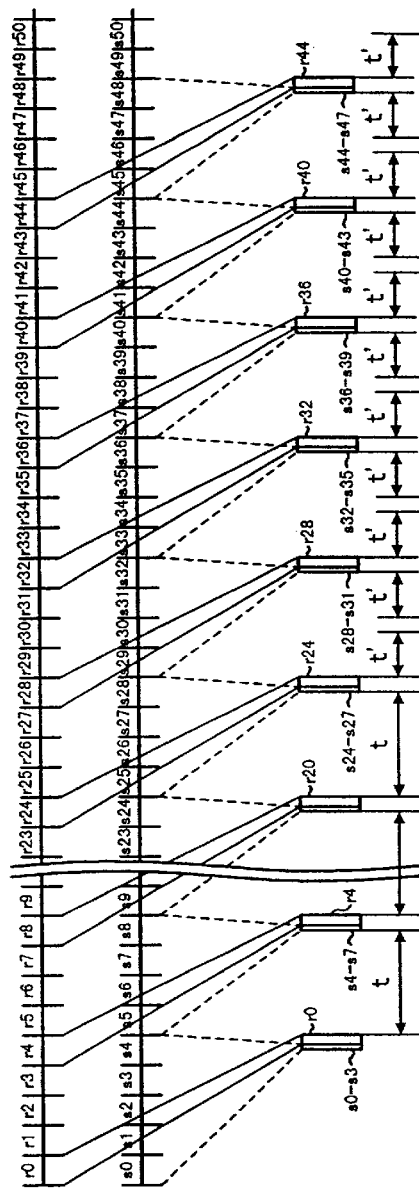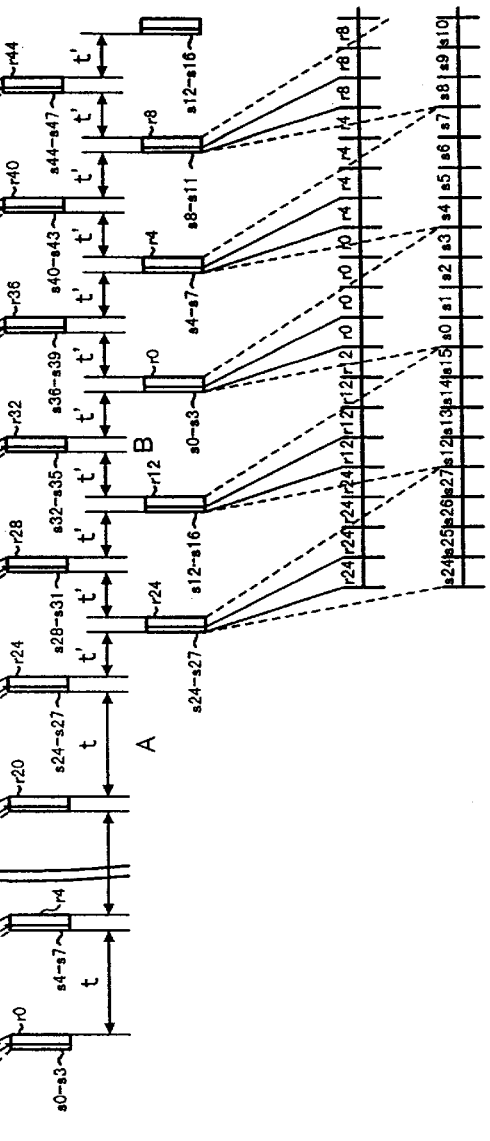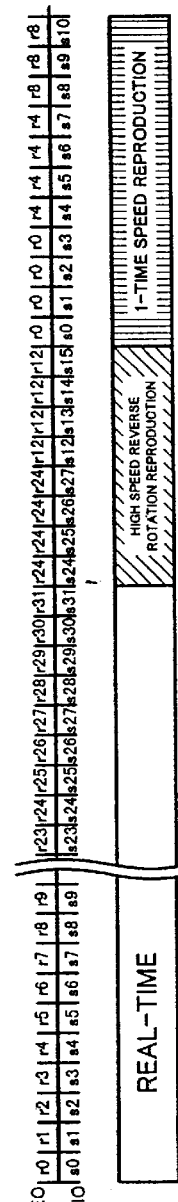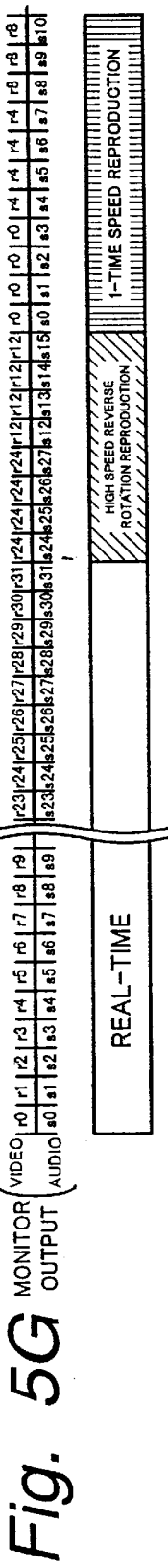
Fig. 5A VIDEO INPUT
Fig. 5B AUDIO INPUT
Fig. 5C DISK WRITE
Fig. 5D DISK READ
Fig. 5E VIDEO OUTPUT
Fig. 5F AUDIO OUTPUT
Fig. 5G MONITOR OUTPUT (VIDEO / AUDIO)

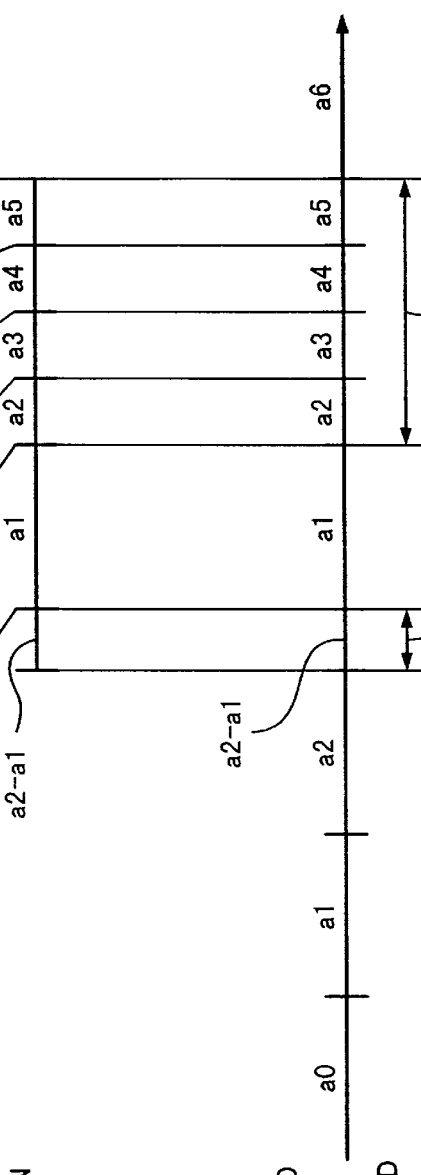

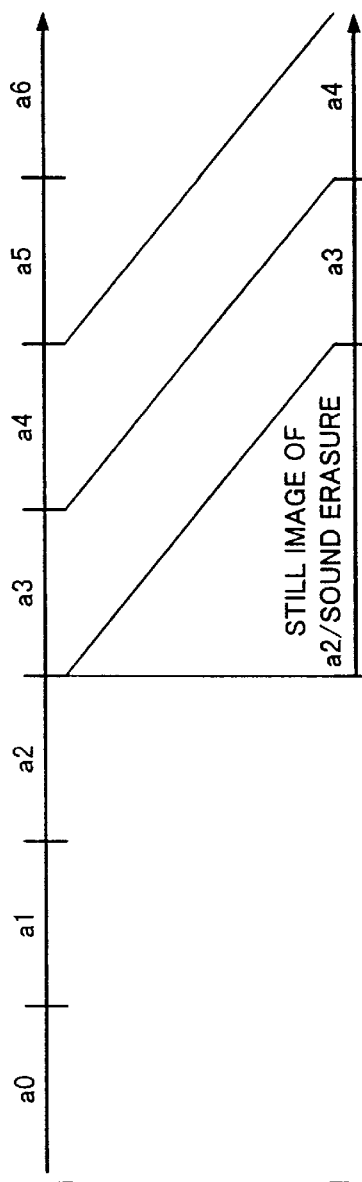
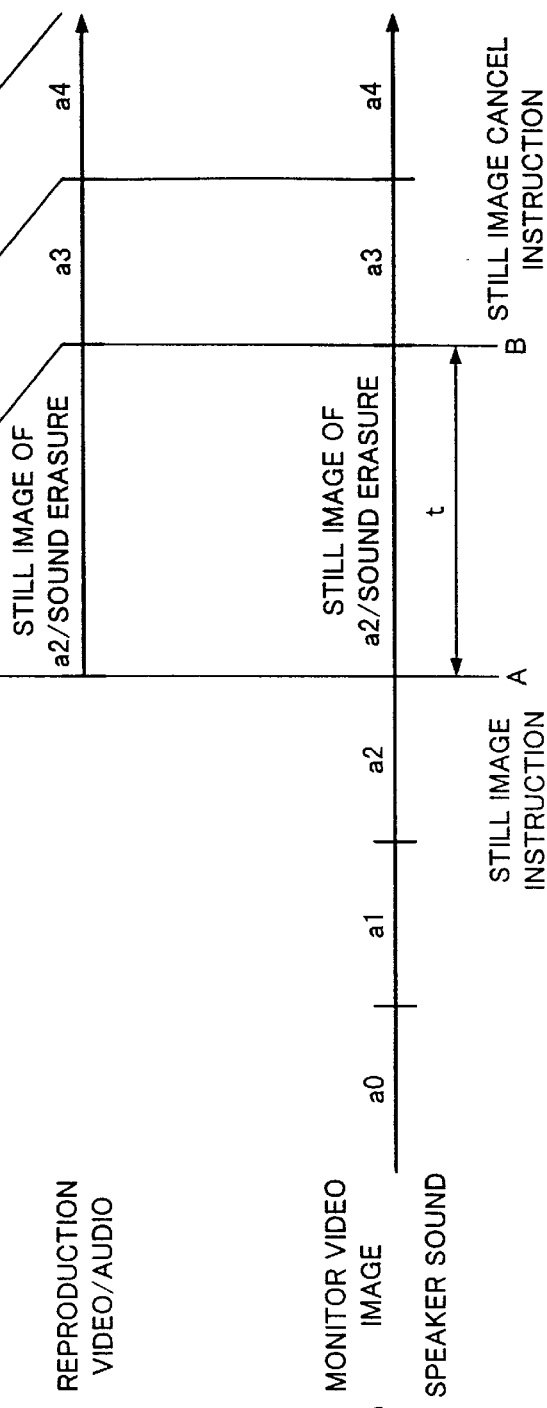
Fig. 7A REAL-TIME BROADCASTING
Fig. 7B REPRODUCTION VIDEO/AUDIO
Fig. 7C MONITOR VIDEO IMAGE / SPEAKER SOUND

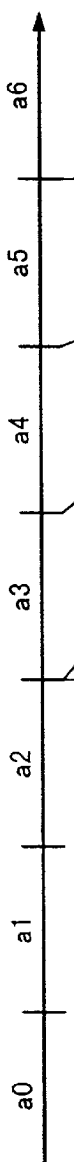
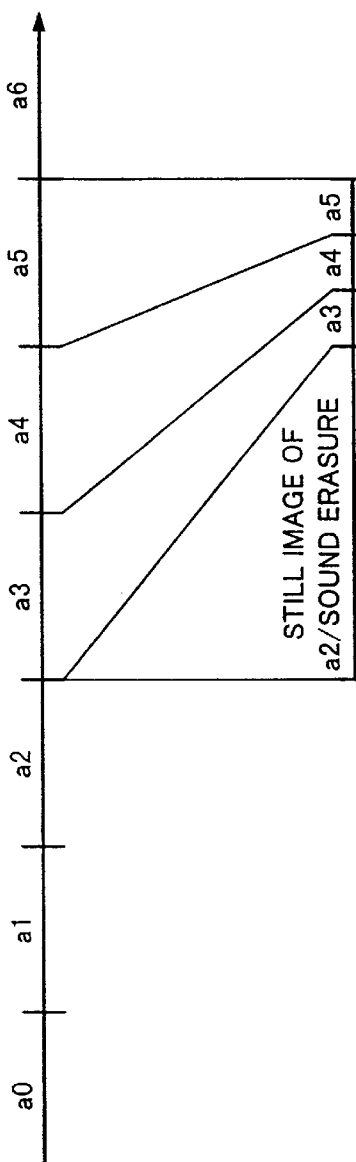
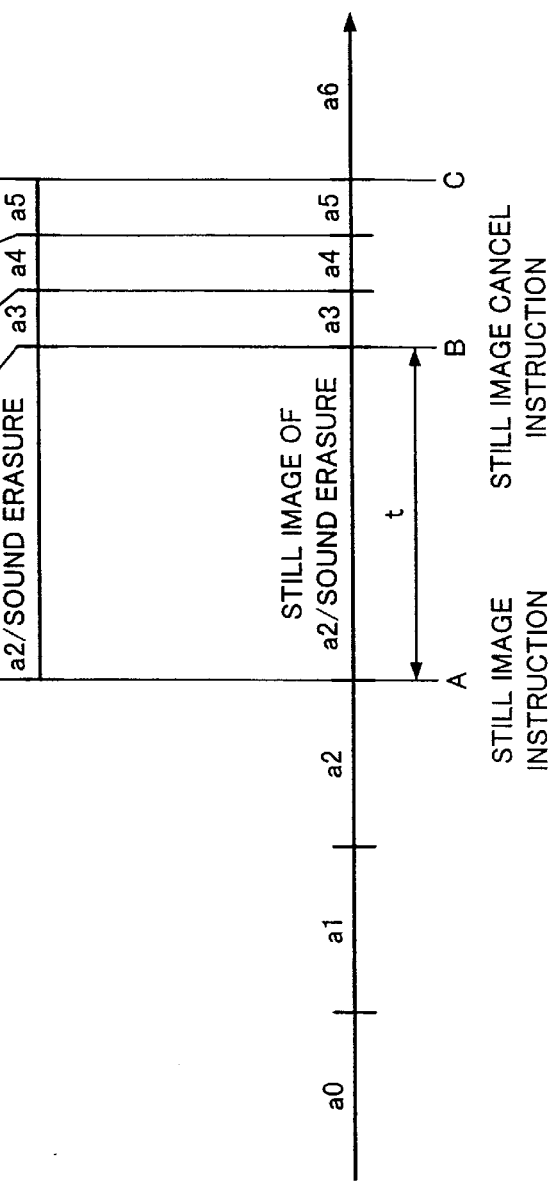
Fig. 8A  REAL-TIME BROADCASTING
Fig. 8B  REPRODUCTION VIDEO/AUDIO
Fig. 8C  MONITOR VIDEO IMAGE / SPEAKER SOUND

TV RECEIVER HAVING RECORDING/ REPRODUCING FUNCTIONS AND METHOD OF RECORDING/REPRODUCING TV SIGNALS

TECHNICAL FIELD

The invention relates to a television receiver having a recording and reproducing function and a recording and reproducing method of a television signal such that a program is always recorded on a recording medium.

BACKGROUND ART

There are many cases where a telephone call suddenly rings or someone suddenly comes while the user is enjoying a television broadcasting program, so that he overlooks a broadcasting program. If the user overlooked a television broadcasting, this program can never be seen except for a program that is rebroadcasted. It is a rare case that the program is rebroadcasted in a short period of time. A news program and a sports program are not rebroadcasted in most cases. In many cases, therefore, if the user overlooked a television broadcasting program, this program cannot be seen forever.

There is a case where a scene such as good scene of a movie or a drama, interview of an important person, highlight scene of a sports program, or the like which the user wants to preserve suddenly starts during the watching of a broadcasting program. In such a case, even if the user immediately sets a VTR, he misses such a scene and he often cannot record the scene.

Therefore, a television receiver such that while the user is watching a broadcasting program, such a program is always recorded on a recording medium is considered. In such a television receiver, even if there is a sudden telephone call or someone suddenly comes, such a program can be traced back and reproduced and he does not overlook the program. Such a program can be easily preserved and even if a program which the user wants to record suddenly starts, it is possible to cope with it.

As a recording medium in the television receiver such that a program is always recorded onto a recording medium as mentioned above, a hard disk drive can be used. Hitherto, as a recording medium for recording a video signal, a magnetic tape is widely used. However, an accessing speed of the magnetic tape is slow and it is difficult to use it as a recording medium that is used in such a television receiver. Although the use of a semiconductor memory is considered, the semiconductor memory of a large capacity is very expensive. In the semiconductor memory, if a power source is turned off, the preserved program is erased, so that it is inconvenient in case of preserving a program for a long time. On the other hand, in the hard disk drive, a capacity is large and an accessing speed is also high enough.

In such a television receiver in which a program is always recorded on the recording medium, a video signal based on a received television broadcasting radio wave is converted to a digital video/audio signal, is compression encoded by a predetermined method, and is recorded to a hard disk drive. For example, a motion JPEG is used for the compression encoding of video data. An audio signal is also converted to digital data by a predetermined method, is compression encoded, and is recorded.

FIG. 12 shows an example of the operation of a television receiver such that a program is always recorded to a recording medium. A television broadcasting as shown in FIG. 12A is received by a tuner. Hereinlater, the television broadcasting which is received by the tuner is called a real-time broadcasting and is distinguished from a video image by the television broadcasting which is reproduced from a hard disk drive. The received signal is subjected to processes as mentioned above and is always written and recorded to the hard disk drive in a real-time manner.

A case where there is an overlooked scene during the watching of a real-time broadcasting by the user and the overlooked scene is reproduced by a predetermined method, for instance, an instruction from a remote commander will now be considered. For instance, in FIG. 12, an instruction to reproduce the overlooked scene is issued from the user to the television receiver at a time point A of the end of an interval a2. In the television receiver, thus, compression data in an interval between a0 and a2 is read out from the hard disk drive while tracing back by only a preset time t0 from time point A when the instruction is issued. The read-out compression data is sequentially subjected to predetermined processes such as compressing and decompressing processes and the like and becomes a reproduction video/audio signal which is started from time point A (FIG. 12B). The timing to start the reproduction video/audio signal is actually accompanied with a slight delay due to the relation of the signal processes.

As for the reproduction video/audio signal obtained as mentioned above, the video signal is reproduced by a video monitor of the television receiver and the audio signal is reproduced by a speaker. The reproduction video/audio signals in the interval between a0 and a2 which was read out from the hard disk drive are reproduced from time point A as shown in FIG. 12C. In this example, it is rewritten to an interval between a3 and a5 of the real-time broadcasting and is reproduced. When the reproduction of the interval between a0 and a2 is finished, the monitor video image and the speaker sound are returned to those by the real-time broadcasting.

However, in the television receiver such that the program is always recorded to the recording medium, when the compression data recorded in the hard disk drive is reproduced by tracing back from the present time, it is merely traced back by time t0 which has previously been designated. There is, consequently, a problem such that it is impossible to return to an arbitrary scene which the user wants to see and reproduce it. That is, for example, in FIG. 12, even in the case where the user wants to again watch the scene in only the interval a1 at time point A, there is a problem such that the program has to be reproduced from the interval a0.

There is also a problem such that even if the hard disk drive is provided, it is impossible to trace back while searching a scene which the user wants to see.

There is, further, a problem such that it is also impossible to wait for a video image of the real-time broadcasting in a still state (paused state). For instance, even in the case where the user leaves his seat for a little while, the reproduction cannot be started from the interrupted scene when he comes back.

DISCLOSURE OF INVENTION

It is, therefore, an object of the invention to provide a television receiver having a recording and reproducing function and a recording and reproducing method of a television signal, in which the reproduction of a video image and an audio sound from a recording medium on which a program is always recorded is flexibly executed in accordance with a request of the user.

To solve the above problems, according to the invention, there is provided a television receiver having a recording and reproducing function, comprising:

a recording medium for always recording a television broadcasting which is received; and recording medium control means for controlling so as to execute the recording to the recording medium and a reproduction from the recording medium in parallel, characterized in that the recording medium control means further executes a control such that during the reception of the television broadcasting, the recording medium is time-sequentially reproduced at a first speed from a position where the television broadcasting has been recorded to the recording medium just before to an arbitrary position in the opposite direction and the recording medium is time-sequentially reproduced at a second speed from the arbitrary position in the positive direction.

According to the invention, there is provided a television receiver having a recording and reproducing function, comprising:

a recording medium for always recording a television broadcasting which is received;

recording medium control means for controlling so as to execute the recording to the recording medium and a reproduction from the recording medium in parallel; and still video image display means for displaying a video image by the television broadcasting by making the video image stationary, characterized in that the recording medium control means further performs a control such that after the still state was cancelled, the reproduction is performed from a scene corresponding to a time when the video image is made stationary.

Further, according to the invention, there is provided a recording and reproducing method of a television signal, comprising:

a step of always recording a television broadcasting which is received onto a recording medium; and a recording medium control step of controlling so as to execute the recording to the recording medium and a reproduction from the recording medium in parallel, characterized in that the recording medium control step further executes a control such that during the reception of the television broadcasting, the recording medium is time-sequentially reproduced at a first speed from a position where the television broadcasting has been recorded to the recording medium just before to an arbitrary position in the opposite direction and the recording medium is time-sequentially reproduced at a second speed from the arbitrary position in the positive direction.

According to the invention, furthermore, there is provided a recording and reproducing method of a television signal, comprising:

a step of always recording a television broadcasting which is received onto a recording medium;

a recording medium control step of controlling so as to execute the recording to the recording medium and a reproduction from the recording medium in parallel; and a step of displaying a video image by the television broadcasting by making the video image stationary, characterized in that the recording medium control step further executes a control such that after the still state was cancelled, the reproduction is performed from a scene corresponding to a time when the video image is made stationary.

As mentioned above, according to the invention, the received television broadcasting is always recorded to the recording medium and the reproduction from the recording medium is executed from an arbitrary position recorded on the recording medium during the reception of the television broadcasting, so that the television broadcasting can be reproduced while tracing back the time.

BRIEF DESCRIPTION OF DRAWINGS

FIGS. 4A to 4C are schematic diagrams showing an example of reproducing video data and audio data from an arbitrary scene and monitoring them;

FIGS. 5A to 5G are diagrams schematically showing an example of a disk access in case of performing a reverse rotation reproduction;

FIGS. 6A to 6C are schematic diagrams showing an example of allowing a reproduction video image to catch up with a video image by a real-time broadcasting;

FIGS. 7A to 7C are schematic diagrams showing an example in which a video image by a real-time broadcasting is paused and, after the pause was cancelled, a video image subsequent to the paused video image is continuously reproduced;

FIGS. 8A to 8C are schematic diagrams showing an example of allowing a reproduction video image to catch up with a video image by a real-time broadcasting after the pause was cancelled;

BEST MODE FOR CARRYING OUT THE INVENTION

Figure 1:
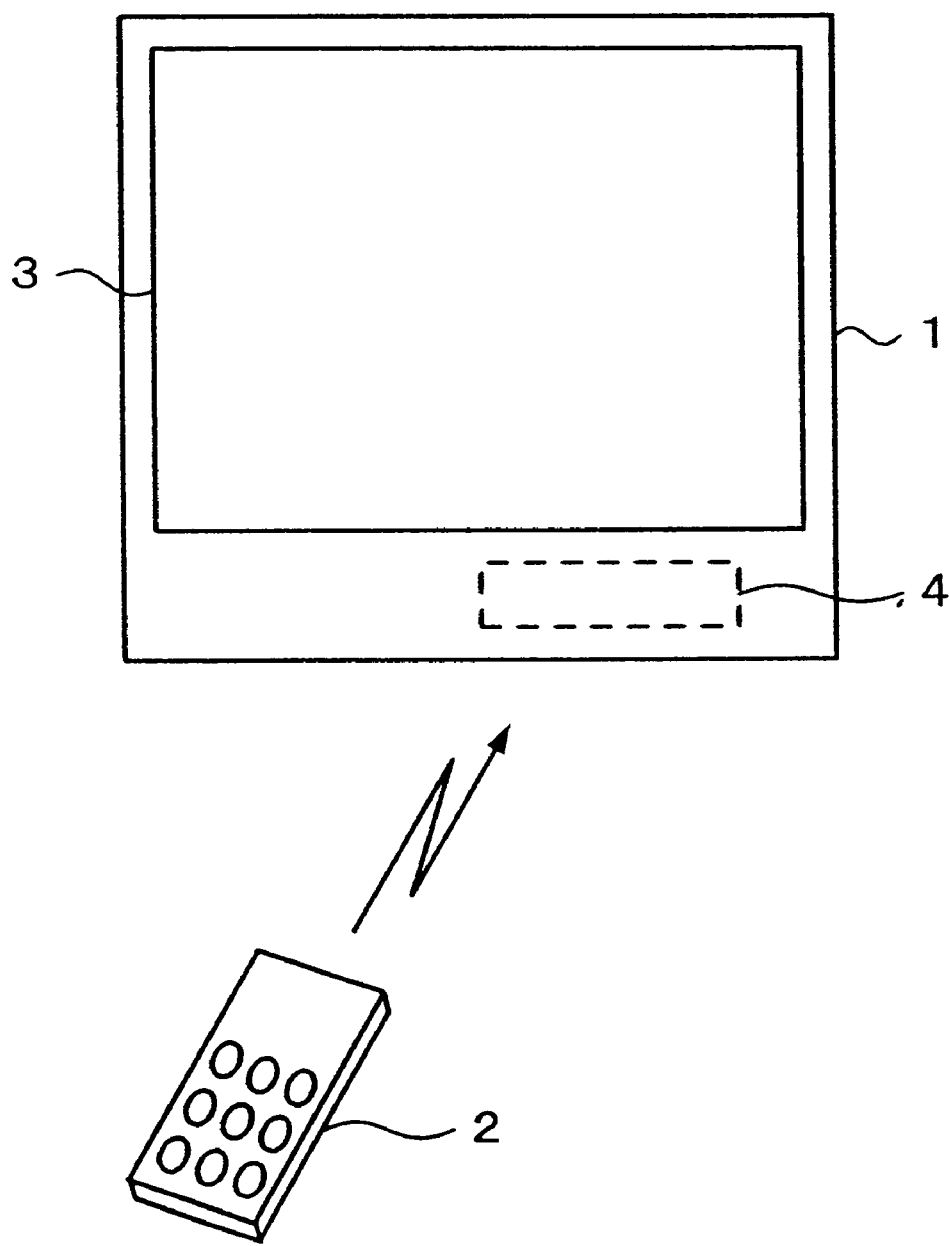
FIG. 1 is a schematic diagram showing an embodiment of the invention.

An embodiment of the invention will now be described hereinbelow with reference to the drawings. FIG. 1 shows the embodiment of the invention. In FIG. 1, reference numeral 1 denotes a television receiver to which the invention is applied and 2 indicates a remote commander to operate the television receiver 1. A video image is displayed on a picture plane 3. A hard disk drive unit 4 is built in the television receiver 1. A program which is being received by the television receiver 1 is always recorded in the hard disk drive unit 4. In such a television receiver having the hard disk drive unit 4, it is possible to trace back and reproduce an overlooked scene or a scene which the user wants to again see or to record and reproduce a desired program.

Figure 2:
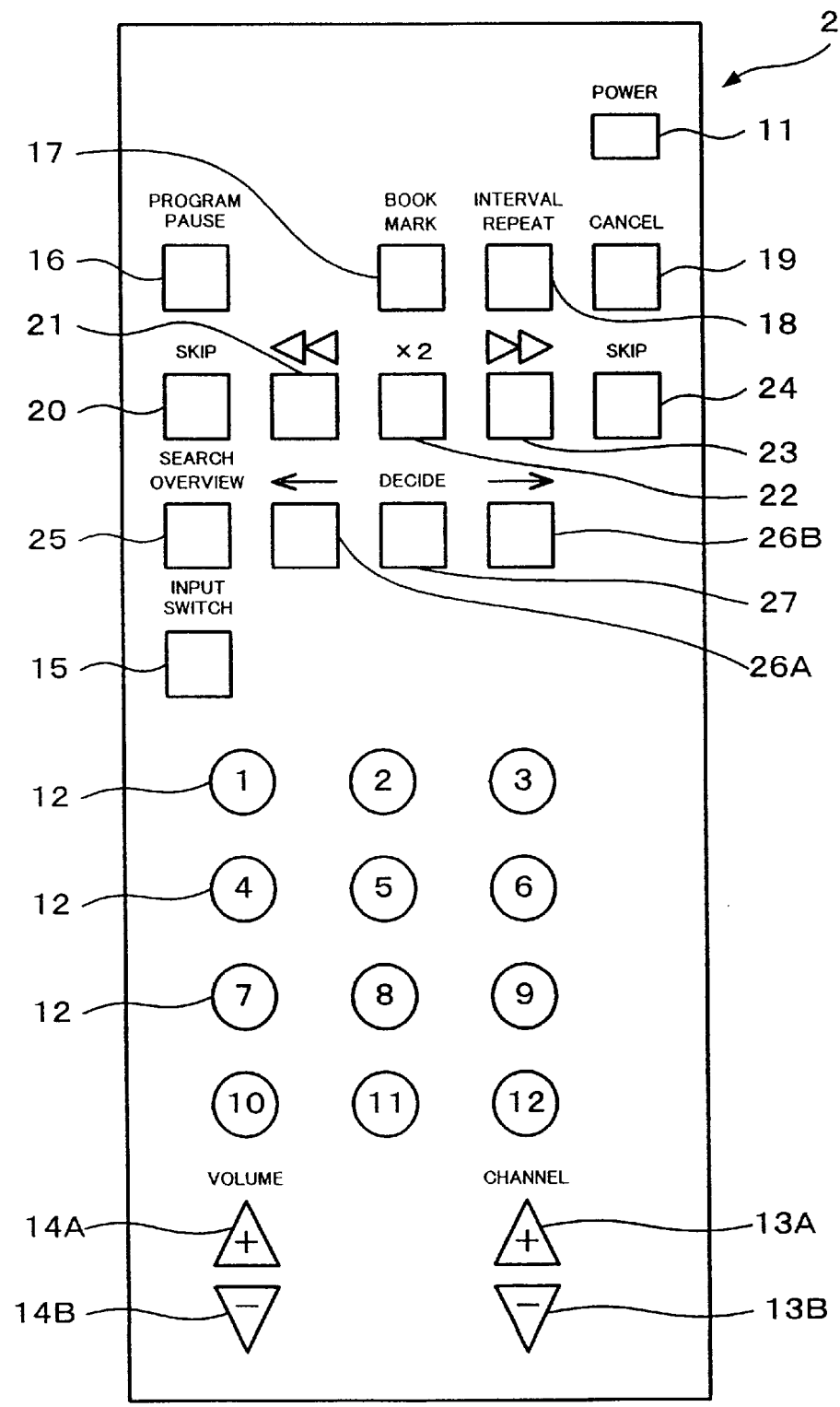
FIG. 2 is a schematic diagram showing an example of a construction of a remote commander to operate a television receiver.

FIG. 2 shows an example of a construction of the remote commander 2 for operating the television receiver 1. Various keys for performing fundamental settings of the television receiver 1 are arranged. That is, a power switch 11 to turn on/off a power source of the television receiver 1, channel keys 12, 12, 12, ... to set a channel, channel up/down keys 13A and 13B, volume up/down keys 14A and 14B, and an input source change-over switch 15 are arranged.

Further, as various keys for controlling the hard disk drive unit 4 of the television receiver 1, a program pause key 16, a bookmark record key 17, an interval repeat key 18, a cancel key 19, a reverse rotation skip play key 20, a reverse rotation high speed feed key 21, a double-speed key 22, a forward rotation high speed feed key 23, a forward rotation skip key 24, an overview search key 25, arrow keys 26A and 26B, and a decide key 27 are arranged for the remote commander 2 to operate the television receiver 1 to which the invention is applied.

When the program pause key 16 is depressed, the picture plane which is being received is stopped at this time point and is displayed as a still image. For this period of time, the program is recorded in the hard disk drive unit 4 of the television receiver 1. When the program pause key 16 is again pressed, the program recorded in the hard disk drive 4 is reproduced from the scene displayed as a still image.

When the bookmark record key 17 is pressed, the program which is being broadcasted in this instance can be preserved in the hard disk drive unit 4 of the television receiver 1.

A repeat reproduction is set by the interval repeat key 18. When the interval repeat key 18 is first depressed, a start position of repetition is set. When the interval repeat key 18 is subsequently pressed, an end position of the repetition is set.

The cancel key 19 is pressed when the set operation or function is cancelled.

The reverse rotation skip play key 20, reverse rotation high speed feed key 21, double-speed key 22, forward rotation high speed feed key 23, and forward rotation skip key 24 are keys to perform a variable speed reproduction. When the double-speed key 22 is pressed during the reproduction of the program recorded in the hard disk drive unit 4, the program is reproduced at a double speed. By again pressing the key 22, the operating mode is returned to the reproduction at a normal speed. While the forward rotation high speed feed key 23 is pressed, the reproduction is executed at a further high speed. When the forward rotation skip key 24 is pressed, the reproduction video image is skipped. While the reverse rotation high speed feed key 21 is pressed, the reverse rotation reproduction is performed at a high speed. When the reverse rotation skip play key 20 is pressed, the reproduction video image is skipped in the reverse rotating direction.

The overview search key 25, arrow keys 26A and 26B, and decide key 27 are used to search a program. When the overview search key 25 is pressed, the picture plane 3 of the television receiver 1 is divided into the center picture plane and a plurality of peripheral small picture planes. The picture planes of every predetermined time among the picture planes recorded in the hard disk drive are displayed in the peripheral small picture planes. By the operations of the arrow keys 26A and 26B, when a desired picture plane is selected from a plurality of picture planes and a desired scene is searched, the decide key 27 is pressed. When the decide key 27 is pressed, the reproduction is started from the selected picture plane.

Figure 3:
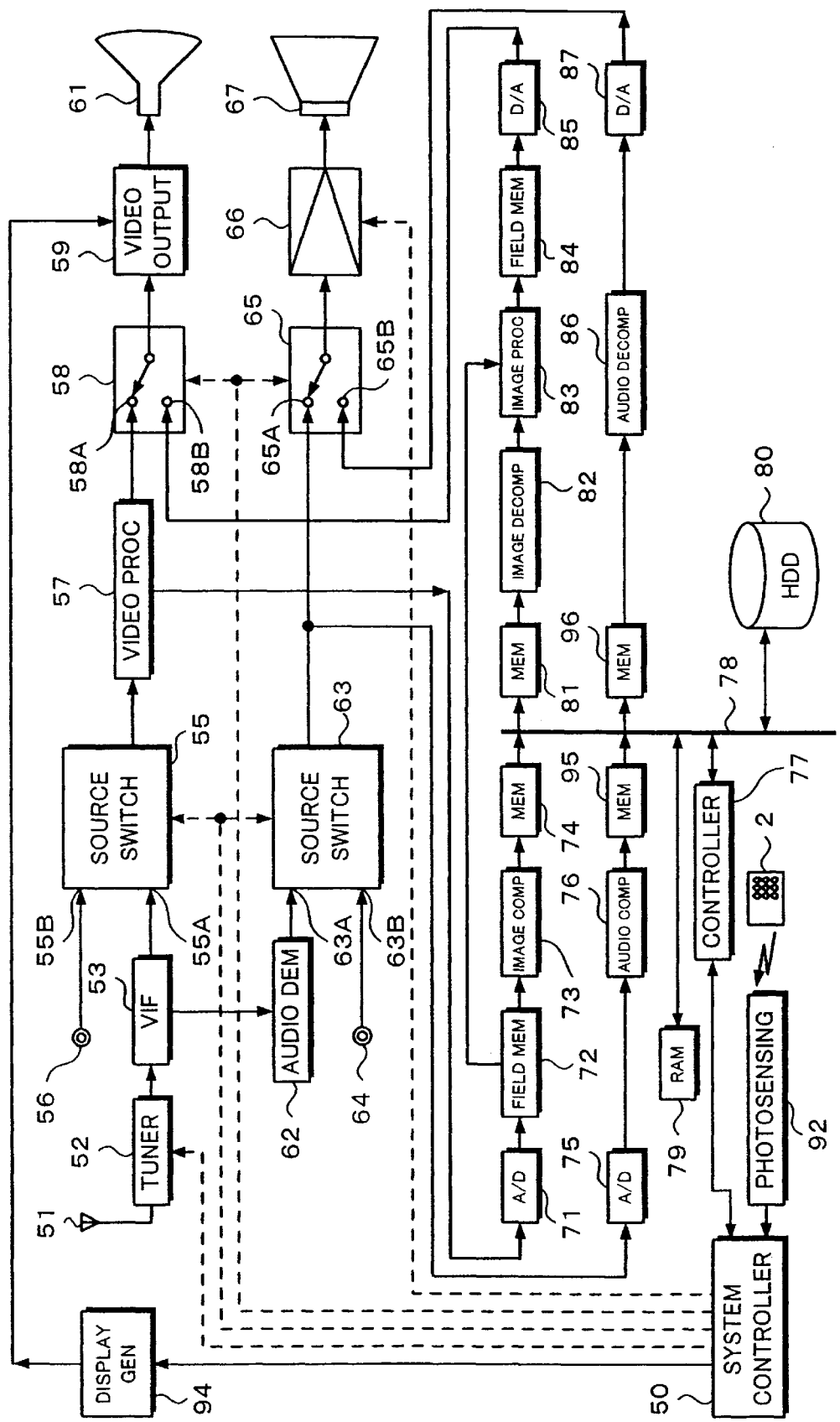
FIG. 3 is a block diagram showing an example of a construction of a television receiver to which the invention is applied.

FIG. 3 shows an example of a construction of the television receiver 1 to which the invention is applied. In FIG. 3, a reception signal received by an antenna 51 is supplied to a tuner circuit 52. A channel set signal is supplied from a system controller 50 to the tuner circuit 52. In the tuner circuit 52, the signal of a desired reception channel is selected on the basis of the channel set signal and this signal is converted into an intermediate frequency signal.

An output of the tuner circuit 52 is supplied to a video intermediate frequency circuit 53. In the video intermediate frequency circuit 53, the intermediate frequency signal from the tuner circuit 52 is amplified and this signal is video detected. Thus, for example, a composite video signal of the NTSC system is obtained. The video signal is supplied to one input terminal 55A of a video source change-over switch 55. The audio signal is detected from a beat component of, for instance, 4.5 MHz in an output of the intermediate frequency circuit 53. This output is supplied to an audio demodulating circuit 62.

A video signal from an external video input terminal 56 is supplied to another input terminal 55B of the video source change-over switch 55. A selection signal is supplied from the system controller 50 to the video source change-over switch 55. The video signal based on the received television broadcasting and the video signal from the external video input terminal 56 are switched by the video source change-over switch 55.

An output of the video source change-over switch 55 is supplied to a video signal processing circuit 57. By the video signal processing circuit 57, a luminance signal Y and a chroma signal C are separated from a composite video signal of the NTSC system. Further, color difference signals U and V are demodulated from the chroma signal C. Component video signals Y, U, and V are formed. The component video signals Y, U, and V are supplied to a terminal 58A of a switching circuit 58 and to an A/D converter 71. An output of a D/A converter 85 is supplied to another input terminal 58B of the switching circuit 58.

The switching circuit 58 is used to switch a picture plane based on received television broadcasting or the video signal from the external video input terminal 56 and a reproduction picture plane from a hard disk drive 80 (corresponding to the hard disk drive unit 4). The switching circuit 58 is controlled by a recording/reproduction controller 77. That is, a control signal from the recording/reproduction controller 77 is supplied to the switching circuit 58 through the system controller 50. In case of displaying the picture plane based on the received television broadcasting or the video signal from the external video input terminal 56, the switching circuit 58 is switched to the terminal 58A side. In case of displaying a reproduction picture plane from the hard disk drive 80, the switching circuit 58 is switched to the terminal 58B side.

An output of the switching circuit 58 is supplied to a video output circuit 59. The video output circuit 59 has: a matrix circuit to form three primary color signals R, G, and B from the component video signals Y, U, and V from the switching circuit 58; and a video amplifying circuit to drive the three primary color signals R, G, and B and supply to a color image receiving tube 61. In the video output circuit 59, the component video signals Y, U, and V from the switching circuit 58 are converted to the three primary color signals R, G, and B and are supplied to the color image receiving tube 61.

The audio signal detected from the beat component of, for example, 4.5 MHz of the output of the intermediate frequency circuit 53 is supplied to the audio demodulating circuit 62. The audio signal is demodulated by the audio demodulating circuit 62. The audio signal is supplied to an input terminal 63A of an audio source change-over switch 63.

An audio signal from an external audio input terminal 64 is supplied to another terminal 63B of the audio source change-over switch 63. The audio signal based on the received television broadcasting and the audio signal from the external audio input terminal 64 are selected by the audio source change-over switch 63.

An output of the audio source change-over switch 63 is supplied to a terminal 65A of a switching circuit 65 and is supplied to an A/D converter 75. An output of a D/A converter 87 is supplied to another input terminal 65B of the switching circuit 65.

The switching circuit 65 switches an audio signal from the received television broadcasting or the external audio input terminal 64 and an audio signal reproduced from a hard disk drive 80. The switching circuit 65 is controlled by the recording/reproduction controller 77. That is, a control signal from the recording/reproduction controller 77 is supplied to the switching circuit 65 through the system controller 50. In case of outputting the audio signal from the received television broadcasting or the external audio input terminal 64, the switching circuit 65 is switched to the terminal 65A side. In case of outputting the audio signal from the hard disk drive 80, the switching circuit 65 is switched to the terminal 65B side.

The output of the switching circuit 65 is supplied to an audio amplifier 66. The audio signal from the switching circuit 65 are amplified by the audio amplifier 66. The audio signal is supplied to a speaker 67.

The component video signals Y, U, and V from the video signal processing circuit 57 is supplied to the A/D converter 71. In the A/D converter 71, the component video signals from the video signal processing circuit 57 are converted to digital signals. An output of the A/D converter 71 is supplied to the field memory 72. In the embodiment, the video data is decimated at a decimation ratio of ¼. Therefore, the video data is written into a field memory 72 every four fields.

An output of the field memory 72 is supplied to an image compressing circuit 73. In the image compressing circuit 73, the component video signals are compressed. For example, a motion JPEG is used as an image compressing system. The video data compressed by the image compressing circuit 73 is temporarily written into a buffer memory 74 comprising, for example, an FIFO (First-In, First-Out).

The audio signal from the audio source change-over switch 63 is supplied to the A/D converter 75. In the A/D converter 75, the audio signal from the audio source change-over switch 63 is converted to a digital signal. An output of the A/D converter 75 is supplied to an audio compressing circuit 76. In the audio compressing circuit 76, the audio signal is compressed. For example, a non-linear PCM is used as an audio compressing system. The audio signal compressed by the audio compressing circuit 76 is temporarily written into a buffer memory 95 comprising, for instance, an FIFO.

The video data and the audio data are read out from the buffer memories 74 and 95 on the basis of a control of the recording/reproduction controller 77. The read-out data is written into the hard disk drive 80 through a bus 78.

The writing of the data to the hard disk drive 80 is performed on a unit basis of one set of data constructed by combining the decimated video data as much as one field and the audio data as much as four continuous fields in which the video data is set to the head. The audio data of four continuous fields is stored at the head and the corresponding video data as much as one field is stored after the audio data. The data of each set is respectively time-sequentially continuously arranged in addresses of the hard disk drive 80.

The video data and audio data recorded in the hard disk drive 80 are reproduced on the basis of the control of the recording/reproduction controller 77.

Upon reproduction, a set comprising the audio data and video data is used as a unit, the audio data is first read out, and the video data is subsequently read out in accordance with the writing order.

In the embodiment, the writing and reading operations of data to/from the hard disk drive 80 are executed in parallel. Those parallel operations are realized by time-divisionally processing the writing and reading operations. That is, in the example in which a decimation ratio of the video data is equal to ¼, each time four fields elapse, the audio data as much as four fields and the video data as much as one field for such a period of time are written. An interval t exists for a period of time from the end of the writing to the start of the next writing. The reading is performed for an interval from the end of the writing of the data to the start of the next writing. An interval t' is provided for a period of time from the writing to the reading and for a period of time from the reading to the writing in consideration of a seeking time of the hard disk drive 80 and a rotation waiting time.

Upon reading, by properly controlling an address of the read-out data on the foregoing data unit basis, a stepwise variable speed reproduction can be performed. That is, when the data is continuously read out, the reproduction is performed at a one-time speed (normal speed). When the data is read out every other data, the double speed reproduction is performed. Similarly, by reading out the data every third data, the triple-speed reproduction is executed.

The audio data which was read out and reproduced from the hard disk drive 80 is temporarily written into a buffer memory 96 comprising, for example, an FIFO through the bus 78. Similarly, the video data which was read out and reproduced from the hard disk drive 80 is temporarily written into a buffer, memory 81 comprising, for example, an FIFO through the bus 78.

The video data is read out from the buffer memory 81 on the basis of the control of the recording/reproduction controller 77. Since the video data has been decimated at a decimation ratio of ¼, the same data is repetitively read out from the buffer memory 81 for a period of time of four fields. The read-out video data is supplied to an image decompressing circuit 82. In the image decompressing circuit 82, for example, the component video data Y, U, and V are formed from the video data compressed by, for instance, the motion JPEG. An output of the image decompressing circuit 82 is supplied to a D/A converter 85 through an image processing circuit 83 to form a multiscreen and a field memory 84. The digital video signal is converted to an analog video signal by the D/A converter 85. An output of the D/A converter 85 is supplied to the terminal 58B of the switching circuit 58.

On the basis of the control of the recording/reproduction controller 77, the audio data is read out from the buffer memory 96. The read-out audio data is supplied to an audio decompressing circuit 86. An output of the audio decompressing circuit 86 is supplied to a D/A converter 87. The digital audio signal is converted into an analog audio signal by the D/A converter 87. An output of the D/A converter 87 is supplied to the terminal 65B of the switching circuit 65.

The system controller 50 performs a whole control of the television receiver 1. The system controller 50 and recording/reproduction controller 77 are bidirectionally connected. An RAM 79 is connected to the bus 78 as a work memory of the recording/reproduction controller 77.

An input is supplied from the remote commander 2 to the system controller 50 through a photosensing unit 92. Various operations are set on the basis of the input from the remote commander 2. An output of the system controller 50 is supplied to a display generating circuit 94. A display signal showing various operation setting states is generated from the display generating circuit 94. An output of the display generating circuit 94 is supplied to the video output circuit 59 and various operating states are displayed on the screen.

The reproducing operation of data from the hard disk drive 80 according to the invention will now be described. FIG. 4 shows an example in which during the watching of the real-time broadcasting, the video image is traced back in response to a request of the user and the video data and audio data are reproduced from an arbitrary scene and are monitored. At first, in the switching circuits 58 and 65, the terminals 58A and 65A are respectively selected, the video image by the real-time broadcasting which is shown in FIG. 4A is displayed for intervals a0, a1, ... and the sound based on the real-time broad casting is reproduced from the speaker 67 for the picture plane 3 (color image receiving tube 61).

For example, it is now assumed that the user wants to reproduce the video image at time point A by tracing back to the head of the interval a1. The reverse rotation high speed feed key 21 of the remote commander 2 is pressed at time point A. This command is received by the photosensing unit 92 and is supplied to the recording/reproduction controller 77 through the system controller 50. The reading operation of the hard disk drive 80 is con trolled by the recording/reproduction controller 77 and the reverse rotation reproduction is performed at a high speed (FIG. 4B). At the same time, on the basis of the control of the system controller 50, the terminals 58B and 65B are selected in the switching circuits 58 and 65, respectively. The video image which is displayed on the picture plane 3 is switched from the video image by the real-time broadcasting to the video image reproduced from the hard disk drive 80 (time point A in FIG. 4C).

The user sees the video image which was reproduced at a high speed by the reverse rotation and displayed on the picture plane 3 and releases the reverse rotation high speed feed key 21 at time point B (in this example, head of the interval a1) when a desired scene appears. Thus, this operation is notified to the recording/reproduction controller 77 through the system controller 50 and the data is read out at a normal speed from the hard disk drive 80. The video image reproduced at the normal speed from the interval a1 is displayed on the picture plane 3.

When the reproduction of the desired interval a1 is finished, the user presses, for instance, the cancel key 19 of the remote commander 2 in order to return to the video image by the real-time broadcasting at, for instance, time point C. A command by the cancel key 19 is supplied to the system controller 50 and the terminals 58A and 65A are selected in the switching circuits 58 and 65, respectively. Thus, the video image which is displayed on the picture plane 3 is switched from the video image reproduced from the hard disk drive 80 to the video image by the real-time broadcasting. The video image from the interval a4 by the real-time broadcasting is displayed on the picture plane 3. At the same time, an instruction is issued to the recording/reproduction controller 77 so as to stop the reading of the data from the hard disk drive 80.

FIG. 5 schematically shows an example of a disk access in case of performing the reverse rotation reproduction. A video signal and an audio signal are supplied as shown in FIGS. 5A and 5B. In the diagrams, intervals r0, r1, . . . , intervals s0, s1, . . . , and the like are expressed on a field unit basis. The inputted video signal and audio signal are subjected to processes such as compression encoding and the like in a real-time manner and become video data and audio data and are written to the hard disk drive 80, respectively. As mentioned above, the writing operation is performed every four fields. The video data of first one field among four fields and the audio data as much as four fields construct one set and are written and recorded (FIG. 5C).

The reverse rotation high speed feed key 21 is pressed at time point A. As mentioned above, when seeing on a field unit basis, time point A is, for instance, an arbitrary point among four fields for an interval from a point when the data is written to the hard disk drive 80 to a point until the next data is written. When the first writing (audio data s24 to s27, video data r24) after the key 21 was pressed is finished, the reading operation is started with the elapse of the predetermined interval t'. First, the data written just before, namely, the audio data s24 to s27 and video data r24 are read out (FIG. 5D). The read-out data is reproduced synchronously with the field just after the end of the reading (FIGS. 5E and 5F).

Hereinafter, until the reverse rotation high speed feed key 21 is released, the data is skipped and read out at every predetermined intervals in the time-sequential reverse direction. In this example, two data is skipped and the reverse rotation reproduction is executed at a triple speed.

The reverse rotation high speed feed key 21 is released at time point B. Time point B is, for example, an arbitrary point among four fields for an interval from a point when the data is read out from the hard disk drive 80 to a point when the next reading operation is performed. As for the next reading operation at time point B when the key 21 is released, the reading based on the reverse rotation high speed feed is continued. This reading operation is set to a start point and the one-time speed reproduction is started. After that, the data is sequentially read out until the cancel key 19 is pressed.

By controlling the access to the hard disk drive 80 as mentioned above, as shown in FIG. 5G, the video image by the high speed reverse rotation is displayed subsequently to the video image by the real-time broadcasting and, further, the one-time speed reproduction is started from the scene searched by the high speed reverse rotation. Even in another reproducing method, which will be explained hereinlater, the writing and reading of the hard disk drive 80 are controlled similarly by the above control.

FIG. 6 shows an example in which in a manner similar to the foregoing example shown in FIG. 4, during the watching of the real-time broadcasting, the video data and audio data are reproduced from an arbitrary scene while tracing back the video image in accordance with a request of the user and, after that, the fast-forward search (high speed forward rotation reproduction) or the reproduction at a speed over the one-time speed is performed, thereby allowing the reproduction video image to catch up with the video image by the real-time broadcasting. When the reproduction video image catches up with the video image by the real-time broadcasting, the video output is switched from the reproduction video image from the hard disk drive 80 to the video image by the real-time broadcasting.

In this case, after the high speed reverse rotation reproduction and the one-time speed reproduction were performed in a manner similar to the above, for example, the forward rotation high speed feed key 23 is pressed at time point C. Thus, an instruction is issued to the recording/reproduction controller 77 through the system controller 50 so as to perform the high speed forward rotation reproduction. On the basis of the control of the recording/reproduction controller 77, the high speed reproduction is performed in the hard disk drive 80.

Subsequent to the interval a1, the intervals a2, a3, . . . are continuously reproduced at a high speed (FIG. 6B). When the reproduction video image catches up with the video image by the real-time broadcasting, the switching circuits 58 and 65 are switched from the terminals 58B and 65B to the terminals 58A and 65A. In this example, the video image catches up at time point D when the high speed reproduction of the interval a5 is formed and is switched to the video image by the real-time broadcasting in the interval a6. Whether the reproduction video image has caught up with the video image by the real-time broadcasting or not can be discriminated by checking, for instance, whether the write address and the read address are close to each other or the same.

FIG. 7 shows an example in which the video image by the real-time broadcasting is temporarily stopped (paused) and a still image is displayed during the reproduction and, when the pause is released, the video image subsequent to the paused video image is continuously reproduced. When the program pause key 16 of the remote commander 2 is pressed at time point A, the terminal 58B is selected in the switching circuit 58. When the pause is designated, the video data written in the field memory 84 is repetitively read out. In case of pause, the audio amplifier 66 is controlled by the system controller 50 and the sound is erased.

When the program pause key 16 is again pressed, the pause state is cancelled (time point B). When the pause state is cancelled, the data subsequent to time point A when the pause was designated is sequentially read out from the hard disk drive 80 and is reproduced.

The pause video image can be also displayed by reading out the data written in the hard disk drive 80 just before time point A. The read-out video data is written into the field memory 84 through the image decompressing circuit 82 and image processing circuit 83. For the pause interval t, the video data written in the field memory 84 is repetitively read out and reproduced synchronously with the field.

FIG. 8 shows an example in which after the pause was cancelled, the fast-forward search or the reproduction at a speed over the one-time speed is executed and a reproduction video image is allowed to catch up with the video image by the real-time broadcasting. In this example, after the pause was cancelled, in a manner similar to the example described by using FIG. 6 mentioned above, the high speed forward rotation reproduction or the reproduction at a speed exceeding the one-time speed is performed. When the reproduction video image catches up with the video image by the real-time broadcasting, the video output is switched from the reproduction video image from the hard disk drive 80 to the video image by the real-time broadcasting.

A display of the picture plane 3 according to the embodiment will now be described. When the reproduction video image from the hard disk drive 80 as mentioned above is displayed onto the picture plane 3, unless such a fact is notified by some method, there is a fear such that the user continuously watches the reproduction video image from the hard disk drive 80 for a long time without knowing it. Such a notification is now performed by displaying to the picture plane 3. A display to the picture plane 3, which will be explained hereinbelow, is generated by the display generating circuit 94 on the basis of the control of the system controller 50 and is synthesized to the output of the switching circuit 58 by the video output circuit 59.

Figure 9A:
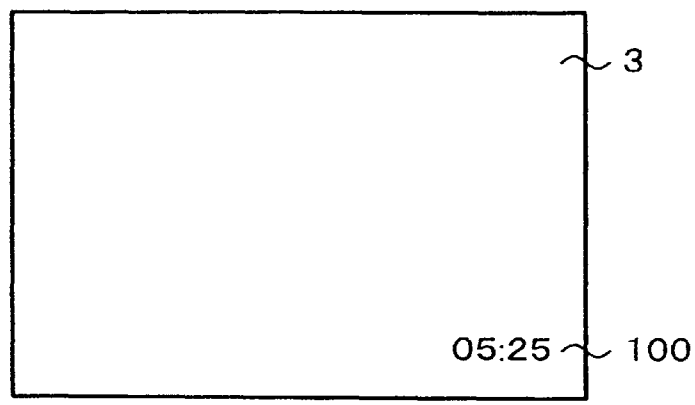
FIGS. 9A to 9C are schematic diagrams showing an example of notifying of a fact that an image is a reproduction video image in the case where the reproduction video image is displayed on a whole screen.

FIG. 9 shows an example of a case where a reproduction video image is displayed on the whole picture plane 3. FIG. 9A shows an example in which a time difference $\Delta t$ between the video image by the real-time broadcasting and the reproduction video image is displayed as a time difference display 100 by a character at a predetermined position on the picture plane 3 on which the reproduction video image is displayed. The time difference $\Delta t$ can be obtained, for example, from the address of the data which is read out from the hard disk drive 80.

Figure 9B:
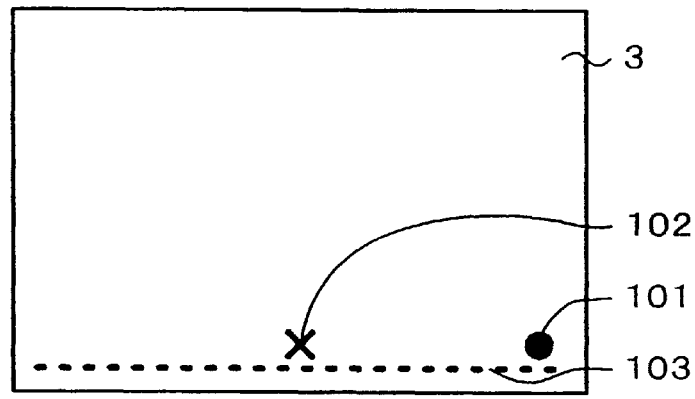

FIG. 9B shows an example in which the time difference $\Delta t$ displayed by the character in FIG. 9A is expressed by icons 101 and 102. The icon 101 shows the present time and is fixedly displayed. The icon 102 shows the time when the reproduction video image displayed at present on the picture plane 3 is written into the hard disk drive 80. That is, an interval between the icons 101 and 102 becomes the time difference $\Delta t$. Therefore, in a case where the high speed reverse rotation reproduction is performed or in the pause state, this interval becomes wider and wider. On the contrary, when the high speed forward rotation reproduction or the reproduction is executed at a speed exceeding the one-time speed, the icon 102 moves in such a direction as to narrow the interval. In case of the one-time speed reproduction, the interval does not change.

A display 103 shows a change in time and always changes so as to be moved from the right to left. By using the display 103 in combination with the icon 101, a state where the time successively changes is expressed. It is more desirable to allow the icons 101 and 102 to have designs each having a special meaning instead of mere symbols as shown in the diagram.

Figure 9C:
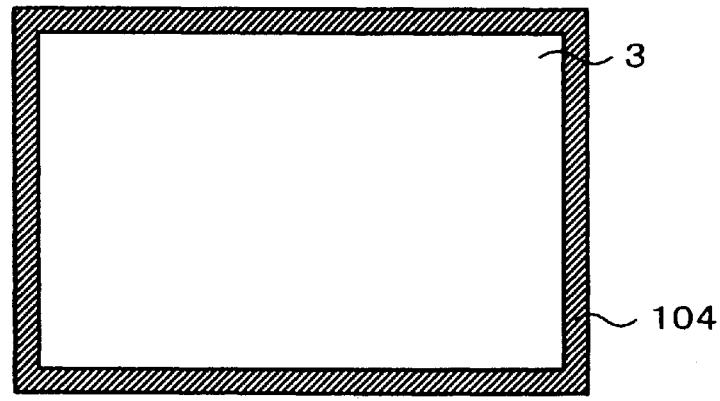

FIG. 9C shows an example in which a frame 104 indicating that the reproduction video image is at present displayed is displayed in the outermost periphery of the picture plane 3. The displays shown in FIGS. 9A to 9C are not displayed when the video image by the real-time broadcasting is displayed. The displays shown in FIGS. 9A to 9C can be also mutually combined.

FIG. 10 shows an example of a display by a twin picture system. According to the twin picture system, as shown in FIG. 10A, the picture plane 3 is divided into a main picture plane 3A and a sub picture plane 3B and different video images are displayed, respectively. In this example, the video image by the real-time broadcasting is displayed in the main picture plane 3A and the reproduction video image is displayed in the sub picture plane 3B.

Figure 10A:
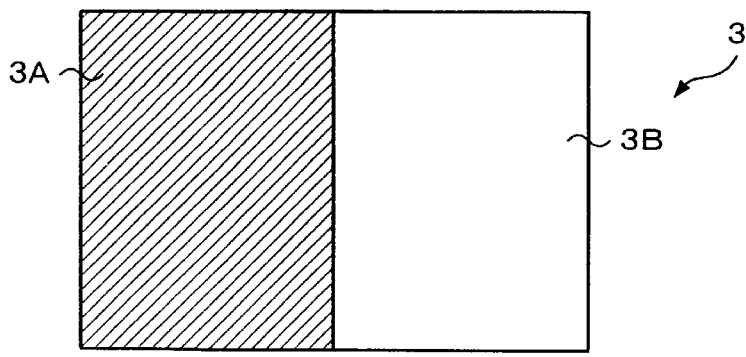
FIGS. 10A to 10D are schematic diagrams showing an example of notifying of a fact that an image is a reproduction video image in case of using a twin-picture system.
Figure 10B:
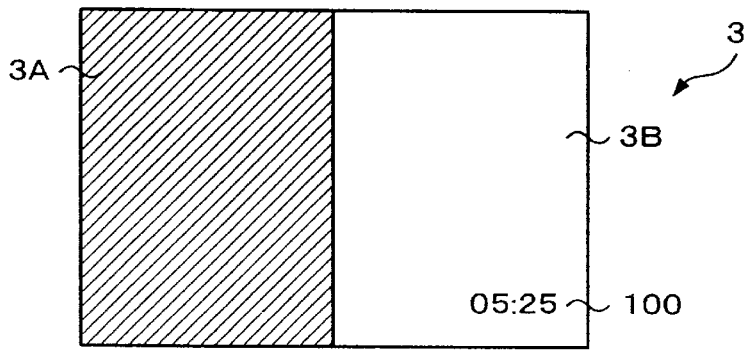
Figure 10C:
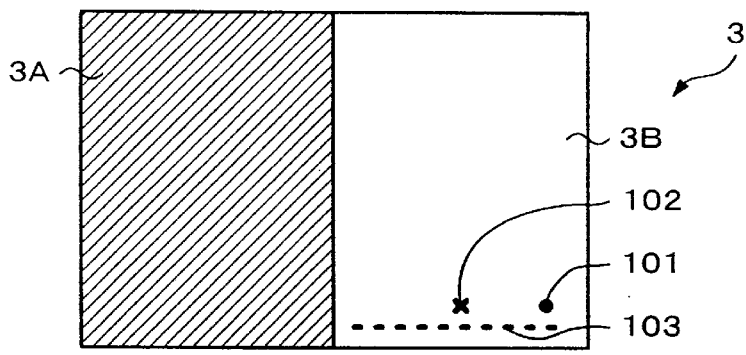
Figure 10D:
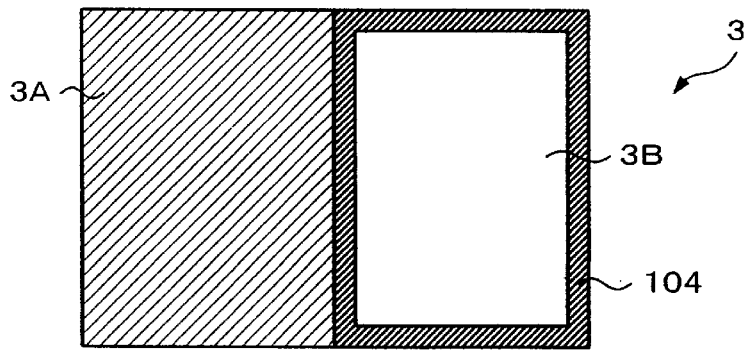

FIGS. 10B, 10C, and 10D correspond to FIGS. 9A, 9B, and 9C mentioned above, respectively. That is, in FIG. 10B, the time difference display 100 is displayed in the sub picture plane 3B. In the example shown in FIG. 10C, the icon 101 showing the present time and the icon 102 showing the writing time of the reproduction video image to the hard disk drive 80 are displayed in the sub picture plane 3B. Further, the display 103 showing the change in time is displayed. In FIG. 10D, the frame 104 indicating that the reproduction video image is displayed is displayed in the outermost periphery of the sub picture plane 3B.

FIG. 11 shows an example of a display by the PIP (Picture-In-Picture) system. According to the PIP system, a slave picture plane 3C of a size smaller than that of a master picture plane 3D is arranged in the master picture plane 3D for the picture plane 3. In this example, the reproduction video image is displayed in the master picture plane 3D and the video image by the real-time broadcasting is displayed in the slave picture plane 3C. This display can be also reversed.

Figure 11A:
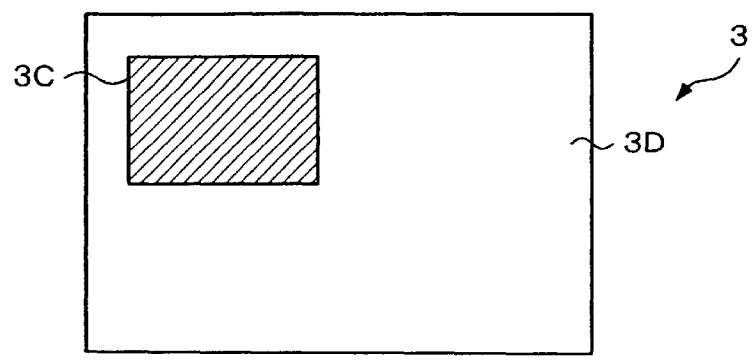
FIGS. 11A to 11D are schematic diagrams showing an example of notifying of a fact that an image is a reproduction video image in case of using a PIP system.
Figure 11B:
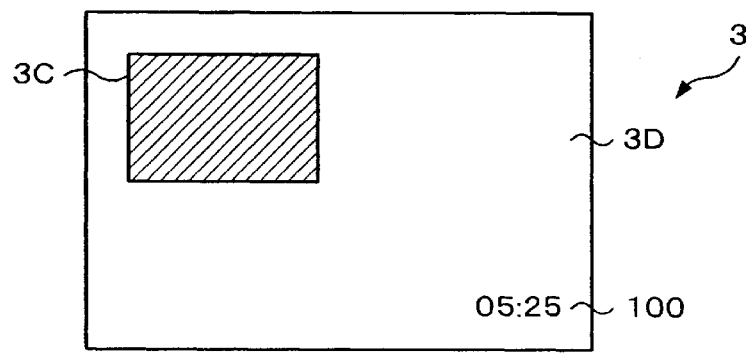
Figure 11C:
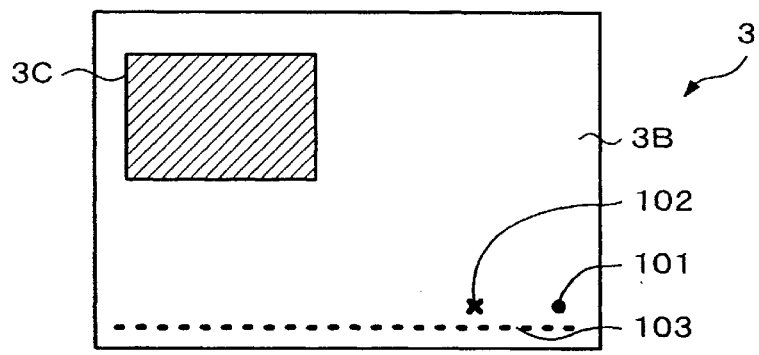
Figure 11D:
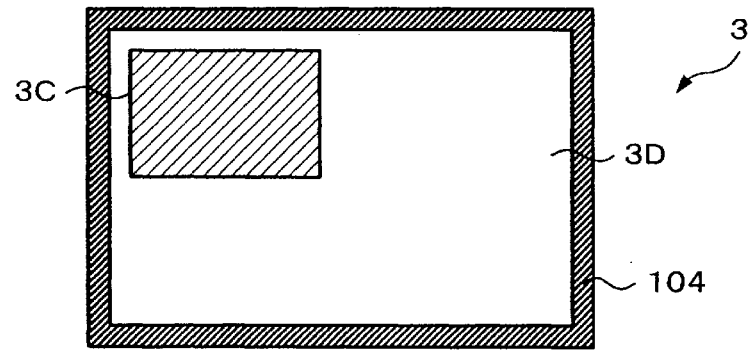
Figures 12A, 12B, 12C:
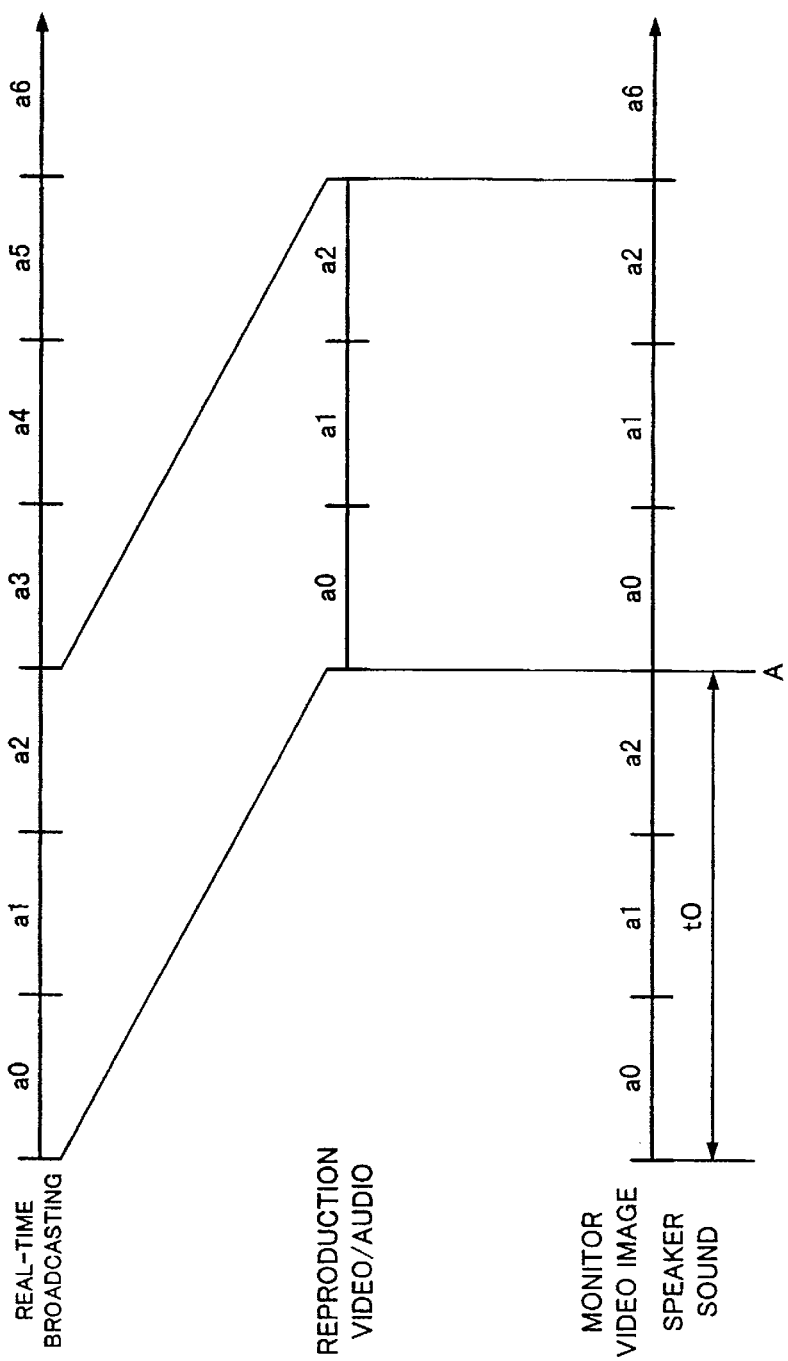
FIGS. 12A to 12C are schematic diagrams showing an example of the operation of a television receiver such that a program is always recorded to a recording medium.

FIGS. 11B, 11C, and 11D correspond to FIGS. 9A, 9B, and 9C mentioned above, respectively. According to the display by the PIP system as well, in a manner similar to the above, a display showing that the displayed picture plane is the reproduction video image is performed to the master picture plane 3D in which the reproduction video image is displayed.

The display by the twin picture system or the display by the PIP system can be obtained by synthesizing the video data which was read out and reproduced from the hard disk drive 80 and the video data read out from the field memory 72 by the image processing circuit 83 and field memory 84.

As described above, according to the invention, the audio data and video data by the real-time broadcasting are always recorded to the hard disk drive and the recorded data can be reproduced by various methods. There is, consequently, an advantage such that even in the case where there is an overlooked scene during the watching of the program by the real-time broadcasting, the overlooked scene can be seen while tracing back to an arbitrary scene which the user wants to see.

Similarly, there is also an advantage such that after the user performed, for example, another work by pausing the program by the real-time broadcasting, the pause is cancelled and a scene subsequent to the paused scene can be watched.

By using the television receiver to which the invention is applied, there is an advantage such that the television broadcasting can be enjoyed without being restricted by the time.

Further, according to the invention, there is an advantage such that the distinction between the video image by the real-time broadcasting, namely, the video image which is at present being broadcasted and the video image reproduced from the hard disk drive can be easily recognized.

What is claimed is:

1. A television receiver having a recording and a reproducing function, comprising:
   a recording medium for continuously recording a received television broadcast;
   recording medium control means for recording said received television broadcast to said recording medium and for reproducing recorded television broadcast data from said recording medium in parallel; and
   display processing means for visually and graphically displaying a time difference between said received television broadcast and said television broadcast data reproduced from said recording medium.

2. A receiver according to claim 1, further comprising:
   means for displaying a fact that a video image reproduced from said recording medium is displayed.

3. The television of claim 1, further comprising still video image display means for displaying a single image from said received television broadcast, and wherein after the display of said still video image is complete, said recording medium control means reproduces said recorded television broadcast data from said recording medium beginning with a portion of said recorded broadcast data corresponding to an image of said received television broadcast immediately following said still video image.

4. A receiver according to claim 3, wherein said recording medium control means executes the reproduction at a predetermined speed until the reproduction after a stationary state is cancelled catches up with said television broadcasting.

5. The television receiver of claim 1, wherein said recording medium control means reproduces said recorded television broadcast data from said recording medium at a first speed from a first position within said television broadcast data toward an arbitrary position in a time-sequentially reverse direction, and reproduces said recorded television broadcast data at a second speed from said arbitrary position in a time-sequentially positive position.

6. A receiver according to claim 5, wherein said recording medium control means performs a control such that when said recording medium is reproduced at a second speed, said recording medium is reproduced at a third speed until a reproduction signal catches up with said television broadcasting.

7. A receiver according to claim 1, further comprising:
   means for displaying a fact that a video image reproduced from said recording medium is displayed.

8. A receiver according to claim 7, wherein
   said display is a display of a time difference between a video image by the television broadcasting which is received and the video image by the reproduction from said recording medium.

9. A receiver according to claim 7, wherein
   a video image received by the television broadcasting and the video image reproduced from said recording medium are simultaneously displayed in one picture plane.

10. A data recording and reproducing method, comprising the steps of:
    continuously recording a received television broadcast;
    recording said received television broadcast to said recording medium and reproducing recorded television broadcast data from said recording medium in parallel; and
    visually and graphically displaying a time difference between said received television broadcast and said television broadcast data reproduced from said recording medium.

11. A method according to claim 10, wherein
    a fact that a video image reproduced from said recording medium is displayed is further displayed.

12. The method of claim 10, further comprising the steps of:
    reproducing said recorded television broadcast data from said recording medium at a first speed from a first position within said television broadcast data toward an arbitrary position in a time-sequentially reverse direction; and
    reproducing said recorded television broadcast data at a second speed from said arbitrary position in a time-sequentially positive position.

13. A method according to claim 12, wherein in said recording medium control step, there is performed a control Such that when said recording medium is to be reproduced at a second speed, said recording medium is reproduced at a third speed until a reproduction signal catches up with said television broadcasting.

14. The method of claim 10, wherein the television of claim 2, further comprising the steps of:

displaying a single image from said received television broadcast; and after the display of said still video image is complete, reproducing said recorded television broadcast data from said recording medium beginning with a portion of said recorded broadcast data corresponding to an image of said received television broadcast immediately following said still video image.

15. A method according to claim 14, wherein in said recording medium control step, a control such as to perform reproduction at a predetermined speed until reproduction after the stationary state was cancelled catches up with said television broadcasting is executed.

16. A method according to claim 10, wherein a fact that a video image reproduced from said recording medium is displayed is further displayed.

17. A method according to claim 16, wherein said display is a display of a time difference between a video image by the television broadcasting which is received and the video image by the reproduction from said recording medium.

18. A method according to claim 16, wherein a video image by the television broadcasting which is received and the video image by the reproduction from said recording medium are simultaneously displayed in one picture plane.

* * * * *